United States Patent [19]

Thomson

[11] Patent Number: 5,249,861
[45] Date of Patent: Oct. 5, 1993

[54] APPARATUS FOR COOLING, WASHING, DRAINING, AND BLENDING LIQUID SUSPENDED MATERIALS

[75] Inventor: Meredith C. Thomson, Watertown, Wis.

[73] Assignee: Kusel Equipment Co., Watertown, Wis.

[21] Appl. No.: 732,145

[22] Filed: Jul. 18, 1991

[51] Int. Cl.⁵ .............................................. B01F 15/02
[52] U.S. Cl. .................................... 366/194; 366/292; 366/312
[58] Field of Search ............... 366/309, 310, 311, 312, 366/313, 279, 292, 245, 244, 248, 249, 184, 194, 195, 196, 131, 150, 341, 325, 329; 99/452, 456, 457; 209/273, 393, 380

[56] References Cited

U.S. PATENT DOCUMENTS

| | | | |
|---|---|---|---|
| 437,910 | 10/1890 | Theurer | 366/194 |
| 535,719 | 3/1895 | Newhall | 366/194 |
| 580,401 | 4/1897 | Hopkins | 209/273 |
| 1,167,536 | 1/1916 | Tokheim | 366/191 |
| 2,322,720 | 6/1943 | Scott et al. | 366/312 |
| 3,123,256 | 3/1964 | Smith et al. | 366/329 |
| 3,165,300 | 1/1965 | Balistrieri | 366/292 |
| 3,362,690 | 1/1968 | McSwain | 366/309 |
| 4,075,713 | 2/1978 | Easton | 366/194 |
| 4,123,801 | 10/1978 | Armanet | 366/312 |
| 4,479,721 | 10/1984 | Rieger | 366/329 |
| 4,722,608 | 2/1988 | Salzman | 366/279 |
| 4,762,684 | 8/1988 | Chantriaux et al. | 366/191 |

FOREIGN PATENT DOCUMENTS

743441 9/1966 Canada ................... 366/279
0020375 5/1984 Japan ....................... 366/279

OTHER PUBLICATIONS

Bulletin 778, Walker Stainless Equipment Co., no date.

*Primary Examiner*—Harvey C. Hornsby
*Assistant Examiner*—Reginald L. Alexander
*Attorney, Agent, or Firm*—Nilles & Nilles

[57] ABSTRACT

The present invention discloses an apparatus for cooling, washing and draining liquid from a suspension of material that includes discrete particles of a friable material such as cottage cheese curd and a transporting liquid, and for blending an additive liquid such as cottage cheese cream dressing into the friable material after it has been drained to prepare a blended material. The apparatus includes a vessel having a bottom wall, a lower aperture in the bottom wall, a side wall and a top wall. A sweep is mounted in the vessel for rotation about a principal axis to gently agitate suspended or blended material. A manifold is mounted in surrounding relation to the lower aperture of the vessel and has upper and lower chambers, a foraminous screen mounted between the upper and lower chambers, a first opening for admitting or exhausting material from the upper chamber above the foraminous screen, and a second opening in fluid communication with the lower chamber for draining liquid. An auxiliary agitator is provided which includes a shaft having upper intermediate and lower portions. The agitator is adapted to be mounted in the vessel for rotation about a secondary axis that is at an acute angle to the principal axis to stir material.

14 Claims, 4 Drawing Sheets

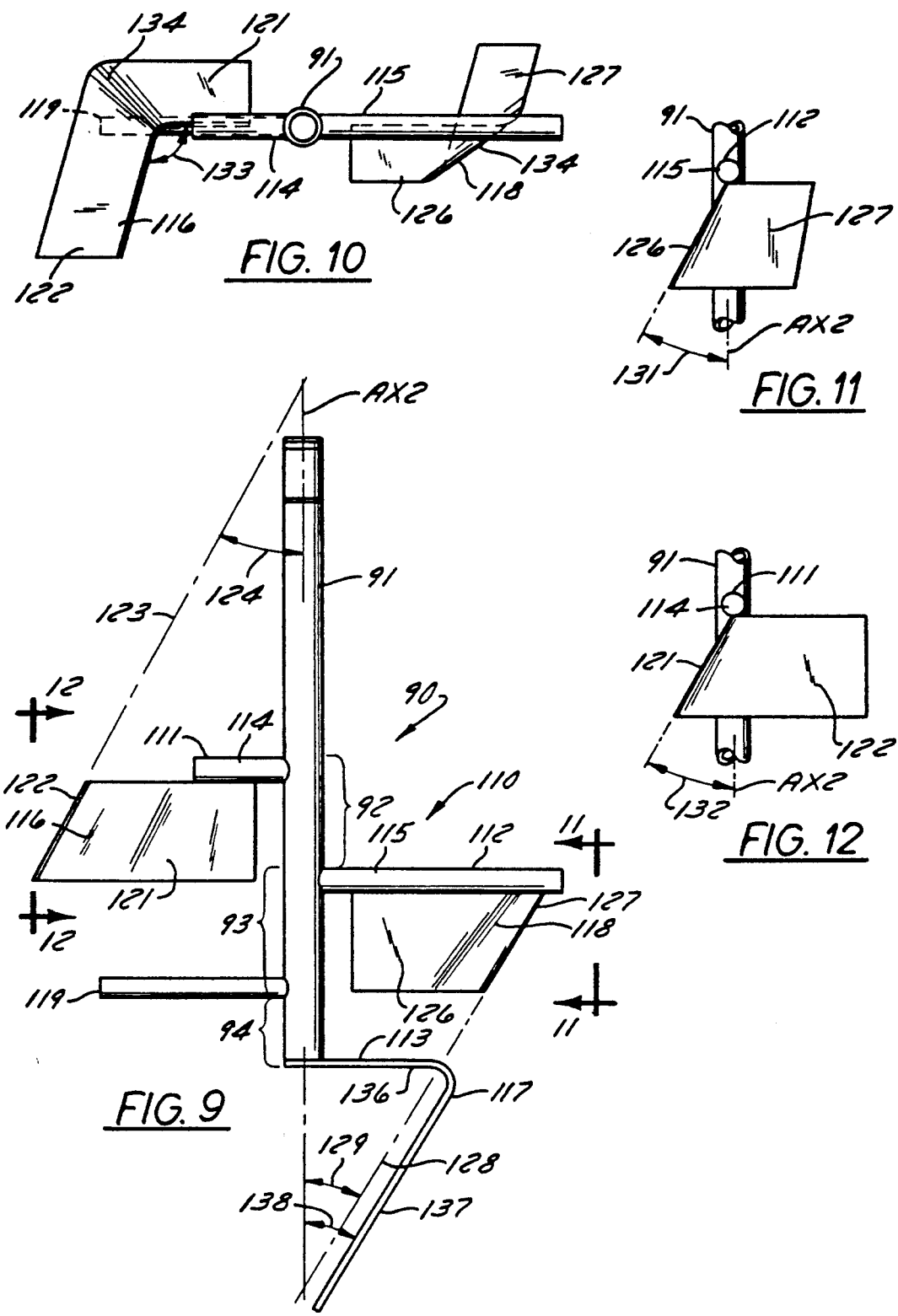

APPARATUS FOR COOLING, WASHING, DRAINING, AND BLENDING LIQUID SUSPENDED MATERIALS

BACKGROUND OF THE INVENTION

1. Field of the Invention

This invention relates to a multipurpose apparatus for processing liquid suspended materials and more particularly to an apparatus adapted to cool, wash and drain liquid from a friable material such as cottage cheese curd, and to subsequently blend a liquid additive into the drained curd material.

2. Description of the Prior Art

In the production of cottage cheese, skim milk is cultured or subjected to direct acidification in a double wall vat, usually 3600 gallons in capacity, until curd and liquid whey are formed. The curd is then cut into ¼" to ⅜" cubes and cooked to firm it and to expel the whey. The whey is drained from the hot curd which is then washed several times with water to cool it and to remove residual whey. Following cooling, the water is drained, a creaming mixture is added and blended into the curd.

These various process steps are carried out in separate expensive pieces of processing apparatus requiring the curd to be transported from one apparatus to another. To transport the curd, it is suspended in a transporting liquid such as whey or whey and cooling water and first pumped to a whey drainer which drains the whey and then adds additional cooling and wash water thereto. The suspension of curd, water and residual whey is then pumped to a separate washer/cooler apparatus which removes the residual whey and water and further cools and washes the curd by adding fresh cooling and wash water. The suspension of curd and fresh water is then pumped to a curd drainer apparatus which drains off the water; and the drained curd is finally passed into a creamer apparatus where a cream dressing is blended into the curd.

The use of individual apparatus is very costly from a capital equipment investment and maintenance standpoint. Further, cottage cheese curd is very fragile and it has long been known that handling causes it to degrade into powder-like fines which suspend in the transporting liquid and flow away with the cooling and wash water. Degradation is known to be highly undesirable for several reasons. First, degradation causes a significant percentage of the curd to be lost. Second, it has become environmentally unacceptable and even unlawful in some jurisdictions to discharge curd fines into the sewage system. Where laws forbid the discharge of such fines into the sewage system, processors truck the wash water and fines into the country where it is distributed over large land areas at high cost. Therefore, handling reduces the amount of finished cottage cheese available for sale and creates fines which are costly to dispose of.

Even though the disadvantages and high costs of using individual pieces of processing equipment have been long known, the prior art does not disclose a simple processing apparatus which is capable of performing multiple processing functions in an efficient manner to reduce costs and minimize the need for pumping a suspension of curd in a transporting liquid to several individual pieces of processing apparatus.

SUMMARY OF THE INVENTION

In accord with the present invention, an apparatus is provided for draining liquid from a suspension of material that includes discrete particles of a friable material such as cottage cheese curd and a transporting liquid, and for blending an additive liquid such as cottage cheese cream dressing into the friable material after it has been drained to prepare a blended material. The apparatus comprises a vessel having a bottom wall, a lower aperture in the bottom wall, a side wall and a top wall. A sweep means is mounted in the vessel for rotation about a principal axis to gently agitate suspended or blended material that may be contained in the vessel when required. A manifold means is mounted in surrounding relation to the lower aperture of the vessel. The manifold means has upper and lower chambers, a foraminous screen mounted between the upper and lower chambers, a first opening means for admitting or exhausting material from the upper chamber above the foraminous screen, and a second opening means in fluid communication with the lower chamber for draining liquid from the vessel through the foraminous screen.

Also, in accord with the invention an auxiliary agitator means is provided which includes a shaft having upper, intermediate and lower portions. The agitator is adapted to be mounted in the vessel for rotation about a secondary axis to stir material in the vessel. The vessel includes upper, intermediate and lower processing zones and the secondary axis of the agitator is positioned at an acute angle relative to the principal axis of the sweep means and passes at least into the upper and intermediate zones of the vessel. The agitator means includes a stirring means mounted to project from the agitator shaft for rotation therewith to alternately pass through one of the zones into an adjacent zone and back into the one zone to gently transport material from one zone into an adjacent zone and back again. Preferably the stirring means will include a paddle means that has radially inner and outer blade members orientated in an angular relationship relative to each other to form a material carrying scoop. The stirring means may include an upper stirring means mounted to project in one radial direction from the upper portion of the agitator shaft for rotation therewith to alternately pass through the upper zone and the intermediate zone; an intermediate stirring means mounted on the intermediate portion of the agitator shaft below the upper stirring means to project in a diametrically opposite direction to the one radial direction; and a lower stirring means mounted on the lower portion of the agitator shaft for rotation therewith to alternately pass through the intermediate and lower zones.

Preferably the upper stirring means will include an upper paddle means; the lower stirring means will include a rod member; and the intermediate stirring means will include an intermediate paddle means and a rod member projecting radially from the agitator shaft. The upper paddle means may have a radially inner blade and a radially outer blade, with the outer blade lying in a first plane that is tangentially disposed at a first acute angle to the shaft, which angle opens toward the lower portion thereof and the intermediate paddle means may have an intermediate radially inner blade and an intermediate radially outer blade that lies in a second plane tangentially disposed at a second acute angle to the shaft, which angle opens toward the upper portion thereof.

The foraminous means of the manifold will have an upper surface that faces the upper chamber of the manifold and the lower surface that faces the lower chamber of the manifold. The first opening means includes a material port that is positioned adjacent to the upper surface to cause material coming into the upper chamber through the first opening means to pass across the upper surface of the foraminous means to minimize the risk that the pumped material will blind over and plug the openings therein. Preferably the first opening means will comprise a blended material discharge port and a separate material port. The foraminous means has spaced apart opposite sides with the material port positioned at one of the opposite sides to direct flow across the upper surface toward the other side, and the second opening means of the manifold includes an outlet port located below the lower surface of the foraminous means at the other of the sides opposite the one side to receive liquid passing through the foraminous means.

Preferably the apparatus will include a liquid outlet means mounted in the top wall to project into the vessel for the purpose of draining liquid from the upper and intermediate zones of the vessel.

BRIEF DESCRIPTION OF THE DRAWINGS

Referring to the drawings,

FIG. 9 is an enlarged side elevational view of a portion of the auxiliary agitator shown in FIG. 1;

FIG. 10 is a top view of the auxiliary agitator shown in FIG. 9;

FIG. 11 is a side elevational view of a portion of the auxiliary agitator taken along line 11—11 of FIG. 9; and FIG. 12 is a partial side elevational view taken along line 12—12 of FIG. 9.

DESCRIPTION OF THE PREFERRED EMBODIMENT

Figure 1:
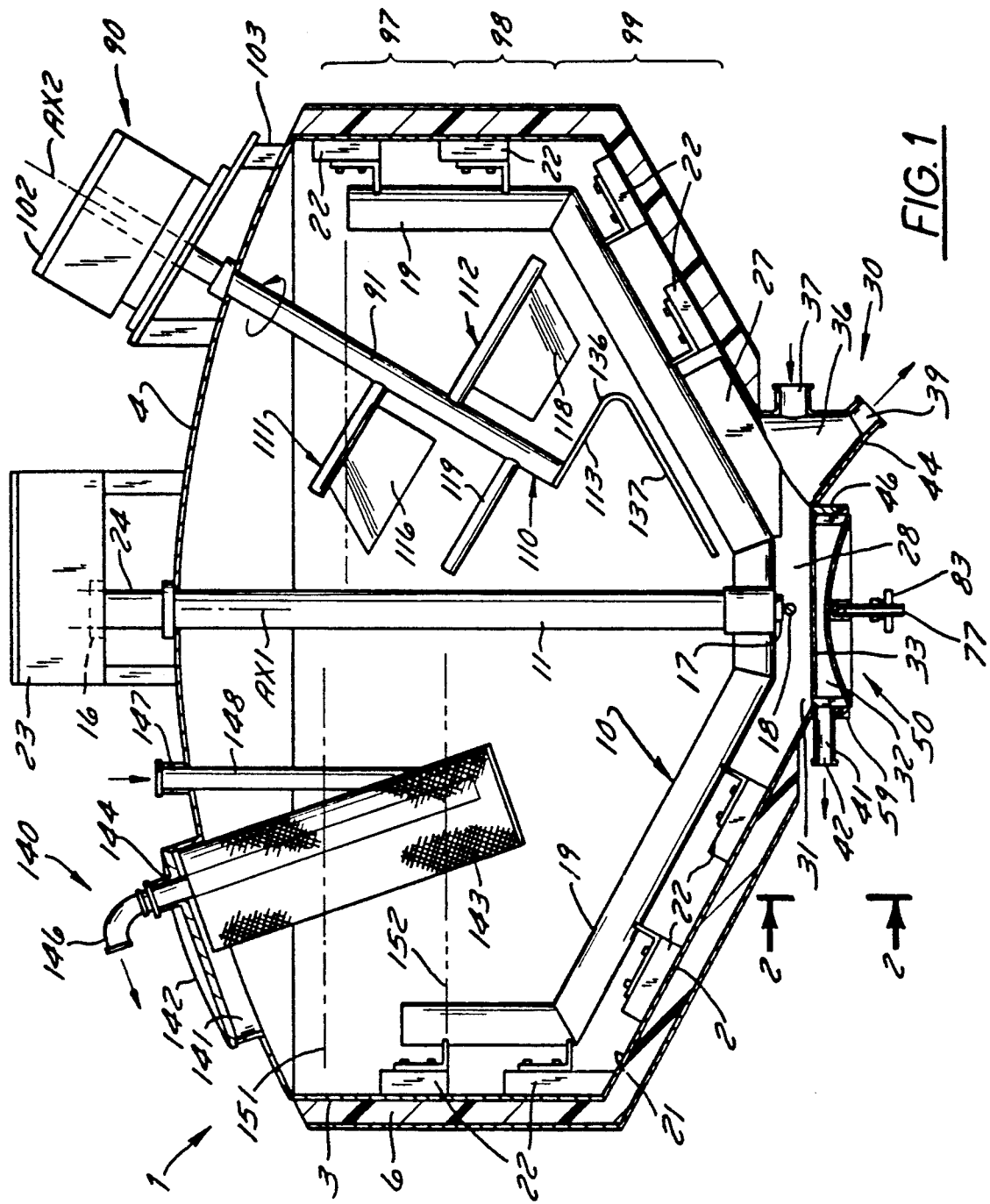
FIG. 1 is a side elevational view, partially in section, of an apparatus constructed according to the present invention.

Referring to FIG. 1, the apparatus includes a vessel 1 having a cone shaped bottom wall 2, a cylindrical side wall 3, and a top wall 4. The cylindrical side wall 3 and the bottom wall 2 may comprise double walls provided with an insulation layer 6 therebetween. If desired, the bottom and side walls may be cooled by circulating a cooling fluid through cooling coils, not shown, in known manner. The vessel 1 is adapted to be supported on a conventional framework, not shown, including a catwalk for providing access to the top thereof.

A sweep means 10 is mounted in the vessel 1 for rotation about a primary, preferably vertical, axis AX1 for the purpose of gently agitating suspended material which is in the vessel or for blending additives which may be added to material in the vessel. The sweep means 10 includes a center shaft 11 which is rotatably supported by upper and lower bearings 17. The upper bearing 16 is fixedly mounted in a drive 23 and the lower bearing 17 is carried by a cross rod 18 mounted in the bottom wall 2. Sweep arms 19 are secured to the bottom end of the center shaft 11 and project radially outwardly and upwardly therefrom in spaced parallel relation to the inner surfaces 21 of the bottom and side walls 2, 3. Scraper members 22 are pivotally mounted on the sweep arms 19 in staggered relation relative to each other in order to clean all areas of the inner surfaces 21 of the bottom and side walls as the sweep arms rotate. A low rpm variable speed drive 23 is connected to the top end 24 of center shaft 11 for rotating the sweep means. The drive 23 is actuated by conventional control means, not shown. The sweep means 10 includes at least one feed member 27 mounted on the sweep arm 20 to rotate therewith. The function of the feed member 27 will be more fully described hereinafter.

Figure 4:
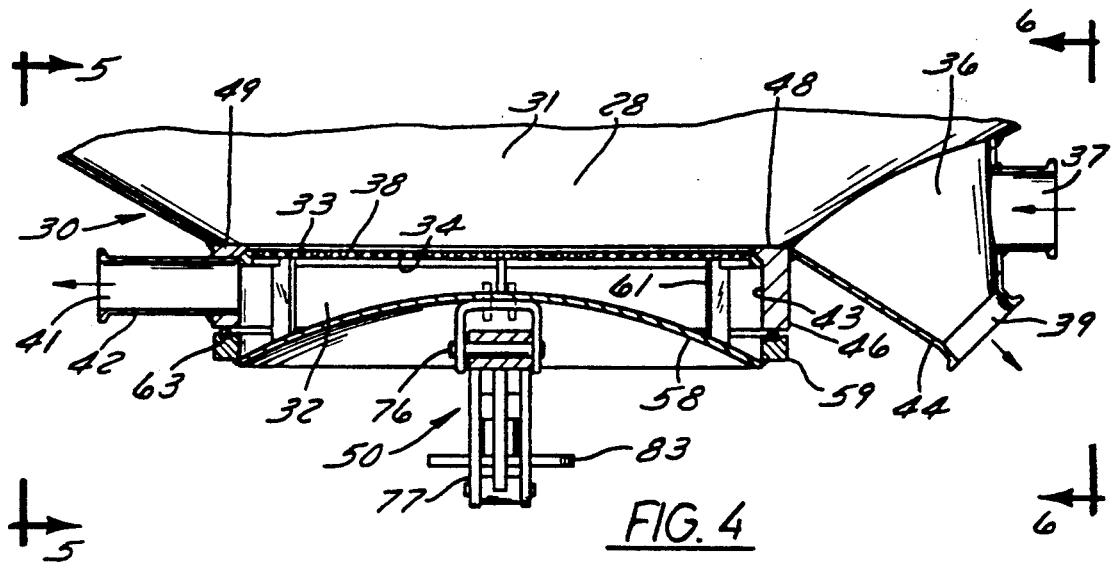
FIG. 4 is an enlarged sectional view of the lower portion of the apparatus shown in FIG. 1.
Figures 5, 6:
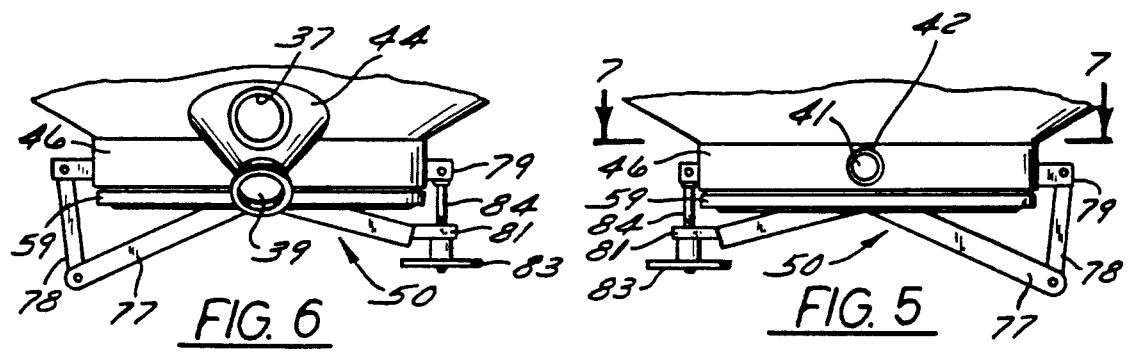
FIG. 5 is a side elevational view taken along line 5—5 of FIG. 4.
FIG. 6 is a side elevational view taken along line 6—6 of FIG. 4.

The bottom wall 2 includes a centrally located lower aperture 28 lying below the center shaft 11 and concentric therewith. A manifold means 30 (FIG. 4) is mounted in surrounding relation to the lower aperture 28. The manifold means 30 preferably will be an integral part of the bottom wall 2 but it could be fabricated as an independent unit and secured to the bottom wall in any suitable manner, such as by welding. Referring to FIG. 4, the manifold means 30 includes an upper chamber 31 and a lower chamber 32. A foraminous means 33 in the form of a wedge wire screen having lower and upper surfaces 34, 38 is mounted between the upper and lower chambers 31, 32 at a right angle to axis AX1 and permits the flow of liquid between the two chambers. The manifold means 30 also includes a first opening means 36 for admitting or exhausting material from the upper chamber 31 and a second opening means 41 in fluid communication with the lower chamber 32 for draining liquid from the vessel through the foraminous means 33. The manifold means 30 includes a cone shaped housing 44. The first opening means 36 includes a material port 37 positioned in housing 44 adjacent the upper surface 38 of the foraminous means 33 and a blended material discharge port 39 which is separate from and below the material port 37. The material port 37 is positioned adjacent to the upper surface 38 of the foraminous means to cause material comprising a transporting liquid and a friable material coming into the upper chamber to pass across the upper surface and generally parallel thereto.

The manifold means 30 further includes an annular frame 46 which is in fixed sealing relation around the lower aperture 28 in the bottom wall 2. The second opening means 41 includes an outlet port 42 located in the annular frame 46 and a bottom opening 43 defined by an inner peripheral vertical surface 47 of the annular frame 46. Flow through material port 37, material discharge port 39, and outlet port 42 is controlled by individual conventional valves, not shown.

As shown in FIG. 4, the foraminous means 33 has spaced apart opposite sides 48 and 49. The material port 37 is positioned adjacent side 48 to direct the flow of material into the vessel across the upper surface 38 toward the other side 49 of the foraminous means. The outlet port 42 of the second opening means is located beneath the lower surface 34 of the foraminous means diametrically opposite side 48 to receive fluid passing through the foraminous means as the suspension of fluid and discrete particles is admitted through material port 37.

Figure 2:
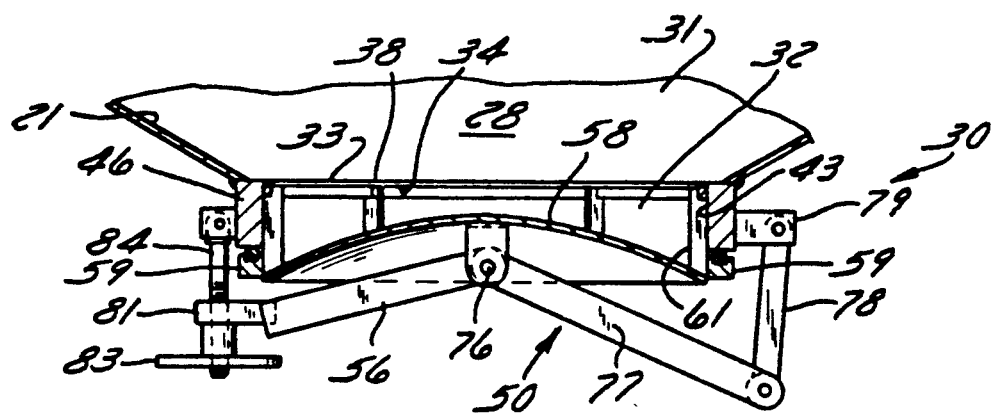
FIG. 2 is a side view taken along line 2—2 of FIG. I showing a closure means in a closed position.
Figure 3:
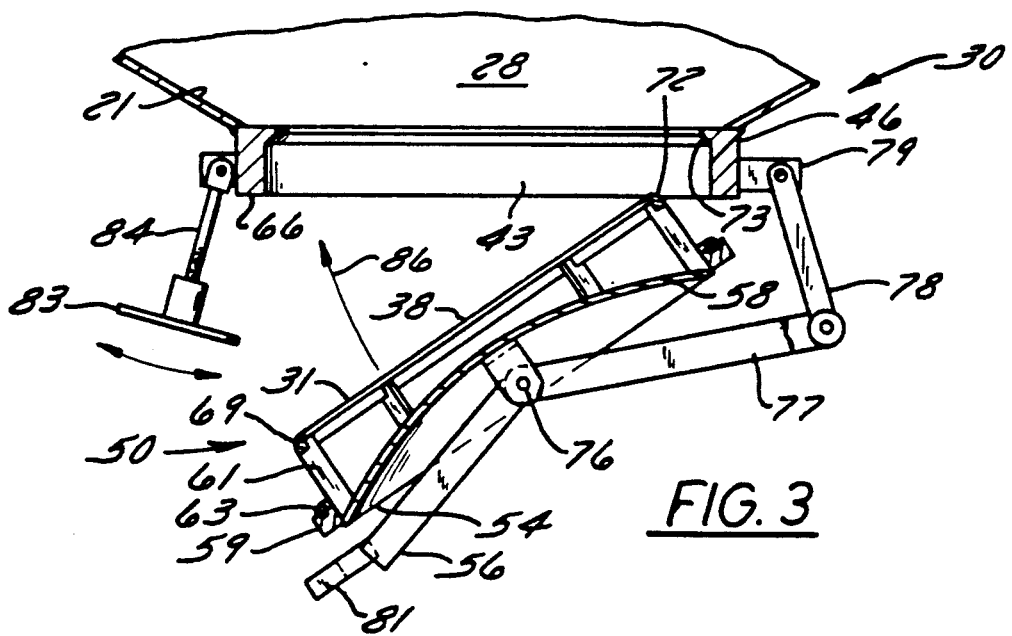
FIG. 3 is a partial side view similar to that of FIG. 2 showing the closure means in a partially open position.
Figure 3A:
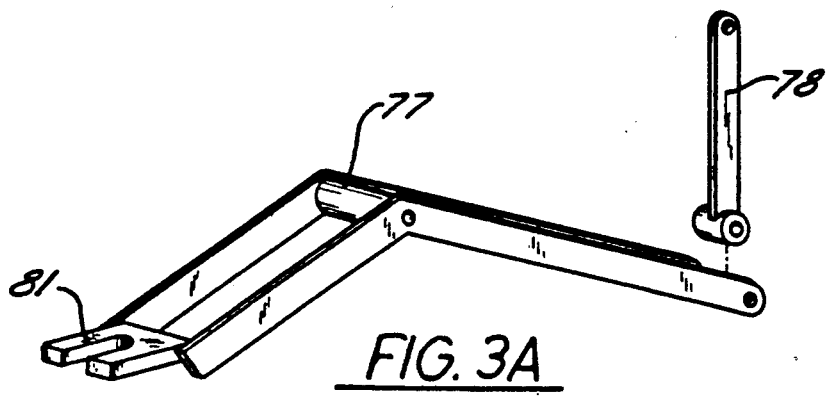
FIG. 3A is an isometric projection view of one component of the closure means shown in FIG. 3.
Figures 7, 8:
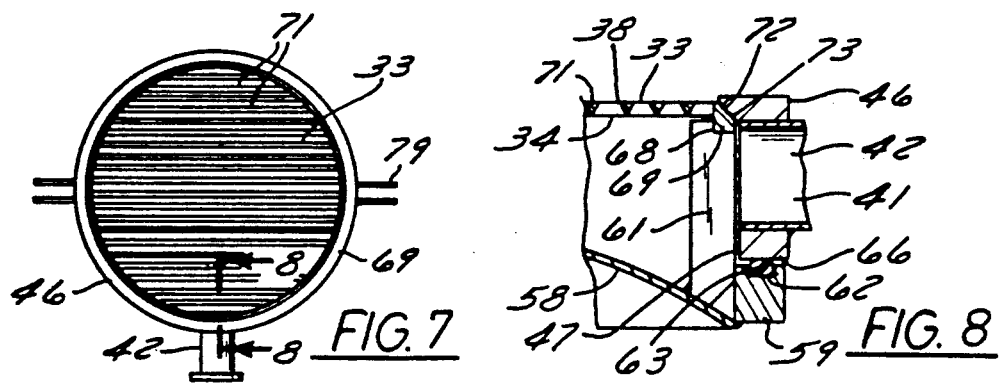
FIG. 7 is a sectional view taken along line 7—7 of FIG. 5.
FIG. 8 is a sectional view taken along line 8—8 of FIG. 7.

A closure means 50, best shown in FIGS. 2, 3 and 3A, is provided for releasably closing the bottom opening 43. The closure means includes a cover assembly 54 and a releasable locking means 56. The cover assembly 54 includes a concave plate 58 having a peripheral rim 59 and a plurality of support arms 61. The rim 59 is of the same diameter as annular frame 46 and is provided with a groove 62 (FIG. 8) in the top edge thereof for receiving an O-ring seal 63 which abuts the lower edge 66 of the annular frame 46. The support arms 61, as best shown in FIG. 8, are each provided with a notch 68 for receiving the annular peripheral edge frame 69 of the foraminous means 33. As best shown in FIGS. 7 and 8, the foraminous means 33 includes a plurality of individual wedge wires 71 triangular in cross section. The wedge wires 71 are supported by the edge frame 69 which is in turn maintained in position in the notches 68 of the support arms 61. The upper peripheral edge of frame 69 is provided with a bevel 72 which mates with a corresponding bevel 73 on the upper inner edge of the annular frame 46. The edge frame 69 of the foraminous means sits loosely in the notches 68 of the support arms 61 and can be removed for cleaning or replacement of another wedge wire screen having different wedge wire sizing characteristics. The cover assembly 54, when in the closed position as shown in FIG. 8, has beveled edge 72 of the wedge wire screen 71 forced into engagement with the bevel 73 of the annular frame 46 and is thereby locked in position.

The releasable locking means 56 includes a bell crank 77 having an intermediate portion pivotally mounted by pin 76 on a bracket carried by cover plate 58; a suspension link 78 pivotally mounted at one free end of the bell crank 77 and connected to a suspension bracket 79 carried by the annular frame 46; a bifurcated latch 81 carried by the other end of the bell crank 77; and a hand wheel locking member 83 threadably mounted on a rod 84 pivotally supported by the annular frame 46. In operation, the opened closure means 50, as shown in FIG. 3, is moved upward in the direction of arrow 86 until bevel 72 mates with bevel 73 on the annular frame 46. The hand wheel 83 is then moved to place rod 84 in the bifurcated latch 81 and rotated to move the cover assembly 54 upward to the position shown in FIG. 2 thereby compressing the O-ring 63 against the lower edge 66 of the annular frame 46 and sealing the bottom opening 43. To open the closure means 50 for service, such as cleaning, the above described procedure is reversed.

The apparatus further includes an auxiliary agitator means 90 which is best shown in FIGS. 1 and 9-12. The auxiliary agitator means 90 includes a shaft 91 having upper, intermediate and lower portions 92, 93, 94, respectively. The shaft 91 is mounted by bearing means, not shown, for rotation about a secondary axis AX2 and is driven by a variable speed drive means 102. The secondary axis AX2 of the agitator shaft 91 is positioned at an acute angle relative to the principal axis AX1 around which the sweep means 10 rotates. As indicated in FIG. 1, the vessel 1 includes upper, intermediate, and lower zones 97, 98, 99 and the shaft 91 passes at least through the upper and intermediate zones 97, 98. The drive means 102 and the shaft 91 are maintained in the acute angle position by support structure 103 secured to the top wall 4 of the vessel.

The auxiliary agitator means 90 includes a stirring means 110 mounted to project from the agitator shaft 91 for rotation therewith to alternately pass through one of the vessel zones into an adjacent zone and back into the one zone to thereby agitate and maintain discrete particles in suspension and to blend additives which may be admitted into the vessel during processing. More specifically, the stirring means 110 includes an upper stirring means 111 mounted to project in one radial direction from the upper portion 92 of the agitator shaft 91; an intermediate stirring means 112 mounted on the intermediate portion 93 of the agitator shaft 91 which lies below the upper stirring means and projects in a diametrically opposite direction to the radial direction in which the upper stirring means projects; and a lower stirring means 113 mounted on the lower portion 94 of the agitator shaft 91 for rotation therewith. The upper stirring means 111 is located so that upon rotation of the agitator shaft 91 the upper stirring means will alternately pass through the upper zone 97, back down through the intermediate zone 98, and back up again through the upper zone 97. When the upper stirring means 111 is passing through the upper zone 97, the intermediate stirring means 112 is passing through the intermediate zone 98 and a portion of the lower zone 99. When the intermediate stirring means 112 is passing through the upper zone 97, the upper stirring means 111 is conversely passing through a portion of the intermediate zone. The lower stirring means 113 is positioned on the lower portion 94 of the agitator shaft 91 for rotation therewith to alternately pass through portions of the intermediate and lower zones 98, 99, respectively.

As best shown in FIGS. 9 and 10, the upper stirring means 111 includes an upper paddle means 116 mounted on a support arm 114 as by welding; the lower stirring means 113 includes a first or lower rod member 117; and the intermediate stirring means 112 includes an intermediate paddle means 118 mounted on a support arm 115 as by welding; and a second or intermediate rod member 119 mounted to project radially from the agitator shaft 91. The upper paddle means 116 has a radially inner blade 121 integrally formed with a radially outer blade 122. The radially outer blade 122 lies in a first plane 123 that is tangentially disposed at a first acute angle 124 relative to the shaft 91, which angle opens toward the lower portion 94 of the shaft. The intermediate paddle means 118 has a radially extending intermediate inner blade 126 and a radially outer intermediate blade 127. The outer intermediate blade 127 lies in a second plane 128 that is tangentially disposed at an acute angle 129 to the shaft 91 with the acute angle 129 opening toward the upper portion 92 of the shaft 91. Preferably each radially inner blade will be angularly disposed relative to and integral with its radially outer blade at an angle 133 of 105° through a radius surface 134 so as to form a cup shape paddle means which will carry material from one zone to an adjacent zone. In addition, it is preferable that each of the radially inner and outer blades be disposed at angles 131 and 132 in FIGS. 11 and 12 of approximately 30° relative to the axis 101 of shaft 91.

The aforementioned angular relationship will provide for a gentle picking up of the cottage cheese curd and a gentle discharging of the cottage cheese curd as the paddle means passes between adjacent zones of the vessel. The second rod member 119 of the intermediate stirring means 112 projects radially at right angles to the shaft 91 and diametrically opposite to support arm 115. The first or lower rod member 117 has a first portion 136 extending radially from shaft 91 diametrically opposite to the second rod member 119. In addition, the lower rod member has a second portion 137 extending at an acute angle 138 relative to secondary axis AX2 which is the same as acute angle 129. The second portion 137 of the lower rod member 117 extends parallel to the second plane 128 when in the position of travel shown in FIG. 9. If desired, more than one upper paddle means 116 and one intermediate paddle means 118 can be mounted on shaft 91. For example, two, three or four paddle means could be provided for the upper and intermediate stirring means 111 and 112.

Referring to FIG. 1, the top wall 4 of the vessel is provided with a liquid outlet means 140. More specifically, the liquid outlet means includes a manhole 141 which is closed by means of a manhole cover 142 hingedly mounted on the top wall 4. A cylindrical draw-off drain screen 143 is removably mounted in the manhole 141 beneath the manhole cover 142 to extend at least into the upper and intermediate zones 97, 98. The manhole cover 142 includes a drain pipe access opening 144 in which a drain pipe 146 is removably mounted to extend into draw-off screen 143. Flow through pipe 146 is controlled by a conventional valve, not shown. The top wall 4 further includes an additive input port 147. One use of the additive input port 147 is to receive a cream dressing input pipe 148 which can be put in place after the cooling, transporting and wash water has been drained off for the purpose of adding cream dressing to the cottage cheese curd. Flow through pipe 148 is controlled by a conventional valve, not shown.

The apparatus as hereinabove described is capable of performing a multiplicity of processing functions which heretofore have been carried out in separate pieces of processing apparatus. The material port 37 permits the operator to fill the apparatus with a suspension of material that includes transporting liquid, such as a mixture of whey and water, and discrete particles of the friable cottage cheese curd. Further, additional cooling water may be admitted, as required, through the material port 37 until the tank is filled to level 151. The draw-off drain screen 143 permits the removal of cooling and wash water simultaneously as curd and cooling and wash water are being admitted to maintain the level of the suspension at level 151 during filling. As the cooling and wash water is removed, the density of the curd in the suspension increases. The outlet port 42 of the second opening means 41 can be opened at any time to further drain cooling and wash water, and preferably such an opening will be after the desired amount of curd has been achieved in the vessel. The draining will lower the material in the vessel to level 152. During filling, the direction of flow of curd and transporting liquid into the upper chamber 31 will be parallel to and across the wedge wire upper surface 38 to create turbulence which assists in preventing blinding or plugging of the drain slots between the wedge wires 71. In addition, the impetus of the transporting liquid during filling is toward the outlet port 42. If the process operator opens outlet port 42, liquid can pass through the wedge wire drain surface and out of the lower chamber without changing direction to maximize the efficiency of draining. Thus it will be appreciated that the operator has the option of first drawing off the transporting liquid such as cooling and wash water from the draw-off screen 143 and subsequently draining the cooling and wash water through outlet 42, or simultaneously draining the cooling and wash water from the draw-off screen 143 and the outlet port 42. In addition, during the filling, washing, cooling and draining process phases, the sweep means 10 can be rotated or not rotated depending on process requirements for agitation of the suspension. Similarly, the auxiliary agitator means 90 may be operated or not operated depending on agitation requirements. Therefore the sweep means 10 and auxiliary agitator means 90 may be operated individually or simultaneously, or not operated at all, during any specific process phase depending on the process requirements.

During processing, additives such as a cream dressing may be fed into the cottage cheese curd material through input pipe 148. Preferably the input pipe 148 will be put into place after the cooling and wash water has been drained from the cottage cheese curd and the drain-off screen 143 and pipe 146 are removed. During the additive blending step, the sweep means 10 and auxiliary agitator means 90 may be operated individually or simultaneously to assist in blending the cream dressing into the curd.

When it is desired to remove the finally creamed product, rotation of the sweep means 10 will cause sweep discharge feed member 27 to pass across the lower aperture 28 to feed the creamed cottage cheese curd into the manifold means 30 and out through the material discharge port 39. Product discharge could take place through only the material port 37 or material port 37 could be closed by conventional valve means, not shown, so that all product discharge takes place through material discharge port 39.

What is claimed is:

1. An apparatus for applying a cooling and washing liquid to a suspension of material that includes discrete particles of a friable material, for draining said liquid, and for blending an additive liquid into said friable material when drained to prepare a blended material comprising:

a vessel (1) having a bottom wall (2), a lower aperture (28) in said bottom wall (2), side walls (3) and a top wall (4);

a sweep means (10) mounted in said vessel (1) for rotation about a principal axis (AX1) to agitate said liquid and said suspension of material or said blended material therein in said vessel (1) and to clean said bottom wall (2) and said side walls (3); and a manifold means (30) in surrounding relation to said lower aperture (28) in the bottom wall (2) of said vessel (1) having upper and lower chambers (31, 32), the upper chamber (31) being in communication with said vessel (1) through said lower aperture (28), a foraminous means (33) mounted between said upper and lower chambers (31, 32) sized to prevent passage of said discrete particles therethrough during operation, a first opening means (36) communicating with the upper chamber (21) and including a material port (37) for admitting said suspension of material or liquid to and a material discharge port (39) for exhausting blended material from said upper chamber (31) without passing through said foraminous means (33), and a second opening means (41) in fluid communication with the lower chamber (32) for draining liquid from said vessel (1) though said foraminous means (33).

2. The apparatus according to claim 1 wherein said apparatus further comprises an auxiliary agitator means including a shaft having upper, intermediate and lower portions mounted in said vessel for rotation about a secondary axis to stir material in said vessel.

3. The apparatus according to claim 2 wherein:
said vessel includes upper, intermediate and lower zones;
said secondary axis of said agitator shaft is positioned in said vessel at an acute angle relative to said principal axis to pass at least into said upper and intermediate zones of said vessel;
said agitator means includes a stirring means mounted to project from said agitator shaft for rotation therewith to alternately pass through one of said zones into an adjacent zone and back into said one zone
said stirring means including an upper stirring means mounted to project in only one radial direction from said upper portion of said agitator shaft for rotation therewith to alternatively pass through said upper and intermediate zones;
an intermediate stirring means mounted on said intermediate portion of said agitator shaft below said upper stirring means to project only in a diametrically opposite direction to said one radial direction; and
a lower stirring means mounted on said lower portion of said agitator shaft for rotation therewith to alteratively pass through said intermediate and lower zones.

4. The apparatus according to claim 3 wherein:
said upper stirring means includes both an upper paddle means;
said lower stirring means includes only a rod member; and
said intermediate stirring means includes only an intermediate paddle means and an intermediate rod member projecting radially from said agitator shaft.

5. The apparatus according to claim 4 wherein:
said upper paddle means has a radially inner blade and a radially outer blade lying in a first plane that is tangentially disposed at a first acute angle to said shaft opening toward said lower portion thereof; and
said intermediate paddle means has a radially inner intermediate blade and a radially outer intermediate blade lying in a second plane that is tangentially disposed at a second acute angle to said shaft opening toward said upper portion thereof.

6. The apparatus according to claim 5 wherein said radially inner and outer blade members are orientated in an integral angular relationship relative to each other to form a material carrying scoop.

7. The apparatus according to claim 1 wherein:
said foraminous means (33) has an upper surface (38) facing said upper chamber (31) and a lower surface (34) facing said lower chamber (32);
and said material port (37) is aligned with said upper surface (38) to cause material coming into said upper chamber (31) through said first opening means (36) to pass transversely across said upper surface (38) to prevent said particles from lodging in said foraminous means (33).

8. The apparatus according to claim 7 wherein said first opening means further includes a blended material discharge port separate from said material port.

9. The apparatus according to claim 7 wherein:
said foraminous means has spaced apart opposite sides;
said first opening means is positioned adjacent one of said sides to direct flow therefrom across said upper surface toward the other of said sides; and
said second opening means is below said lower surface adjacent the other of said sides opposite said one side to receive liquid passing through said foraminous means.

10. The apparatus according to claim 1 wherein:
said vessel has a vertical axis;
said foraminous means comprises a wedge wire screen positioned at a right angle to said vertical axis of said vessel; and
said first opening means includes a material port positioned to direct a flow therefrom parallel to said upper surface and at a right angle to said vertical axis.

11. The apparatus according to claim 1 wherein said apparatus further includes a liquid outlet means mounted in said top wall and projecting into said vessel to exhaust liquid from said vessel.

12. The apparatus according to claim 1 wherein said second opening means includes:
an outlet port;
a bottom opening in said lower chamber separate from said outlet port; and
a closure means for releasably closing said bottom opening.

13. The apparatus according to claim 12 wherein:
said closure means includes a plate member dimensioned to be placed in fluid tight relation to said bottom opening;
said plate member having spacer means projecting therefrom for supporting said foraminous member in spaced relation thereto whereby said plate member and foraminous means define said lower chamber therebetween; and
a locking means for releasably securing said plate member to said manifold.

14. The apparatus according to claim 1 wherein:
said sweep means includes a feed member mounted to rotate therewith and pass over said lower aperture for urging material into said manifold.

* * * * *